(12) United States Patent
Yang et al.

(10) Patent No.: US 10,113,125 B2
(45) Date of Patent: Oct. 30, 2018

(54) METHOD AND SYSTEM FOR COGENERATING GAS-STEAM BASED ON GASIFICATION AND METHANATION OF BIOMASS

(71) Applicant: Sunshine Kaidi New Energy Group Co., Ltd., Wuhan (CN)

(72) Inventors: Weiguang Yang, Wuhan (CN); Yan Gong, Wuhan (CN); Xiaodong Zhan, Wuhan (CN); Dechen Song, Wuhan (CN)

(73) Assignee: SUNSHINE KAIDI NEW ENERGY GROUP CO., LTD., Wuhan (CN)

( * ) Notice: Subject to any disclaimer, the term of this patent is extended or adjusted under 35 U.S.C. 154(b) by 0 days.

(21) Appl. No.: 15/429,129

(22) Filed: Feb. 9, 2017

(65) Prior Publication Data

US 2017/0152454 A1    Jun. 1, 2017

Related U.S. Application Data

(60) Division of application No. 14/522,630, filed on Oct. 24, 2014, now Pat. No. 9,593,286, which is a
(Continued)

(30) Foreign Application Priority Data

Apr. 27, 2012   (CN) .......................... 2012 1 0128134

(51) Int. Cl.
| | |
|---|---|
| *C10L 3/08* | (2006.01) |
| *F22B 1/18* | (2006.01) |
| *F22B 27/14* | (2006.01) |
| *C10J 3/82* | (2006.01) |

(Continued)

(52) U.S. Cl.
CPC . *C10L 3/08* (2013.01); *C10J 3/82* (2013.01); *C10J 3/86* (2013.01); *F22B 1/18* (2013.01);
(Continued)

(58) Field of Classification Search
CPC ........ C10J 2300/1662; C10J 2300/1246; C10J 2300/1687
See application file for complete search history.

(56) References Cited

U.S. PATENT DOCUMENTS 3,966,633 A * 6/1976 Friedman .................. C01B 3/22
252/373
4,133,825 A * 1/1979 Stroud .................. C07C 1/0485
48/197 R
(Continued)

*Primary Examiner* — Matthew J Merkling
(74) *Attorney, Agent, or Firm* — Matthias Scholl, PC; Matthias Scholl

(57) ABSTRACT

A system for cogenerating gas-steam based on gasification and methanation of biomass, the system including a gasification unit, a shift unit, a purification unit, a methanation unit, and a methane concentration unit. A waste heat boiler is provided in an upper part of a gasifier of the gasification unit. The methanation unit includes a first primary methanation reactor, a second primary methanation reactor, a first secondary methanation reactor, and a second secondary methanation reactor connected in series. An outlet of the second primary methanation reactor is provided with two bypasses, one of which is connected to an inlet of the first primary methanation reactor, the other of which is connected to the first secondary methanation reactor. The second secondary methanation reactor is connected to the methane concentration unit.

3 Claims, 3 Drawing Sheets

Related U.S. Application Data continuation-in-part of application No. PCT/CN2013/074232, filed on Apr. 16, 2013.

(51) Int. Cl.
  *C10J 3/86* (2006.01)
  *F22G 1/02* (2006.01)

(52) U.S. Cl.
  CPC ............... *F22B 27/14* (2013.01); *F22G 1/02* (2013.01); *C10J 2300/0916* (2013.01); *C10J 2300/1662* (2013.01); *C10J 2300/1687* (2013.01); *C10L 2200/0469* (2013.01); *C10L 2290/04* (2013.01); *C10L 2290/06* (2013.01); *C10L 2290/10* (2013.01); *C10L 2290/42* (2013.01); *Y02E 20/16* (2013.01); *Y02E 20/18* (2013.01); *Y02E 50/32* (2013.01)

(56) References Cited

U.S. PATENT DOCUMENTS

| | | | |
|---|---|---|---|
| 2010/0162626 A1* | 7/2010 | Clomburg, Jr. | B01J 8/0285 48/197 FM |
| 2010/0162627 A1* | 7/2010 | Clomburg, Jr. | C07C 1/06 48/197 FM |
| 2010/0170247 A1* | 7/2010 | Bommareddy | C10L 3/08 60/653 |
| 2010/0286292 A1* | 11/2010 | Wix | C10L 3/08 518/702 |
| 2011/0229382 A1* | 9/2011 | Frydman | C10J 3/86 422/621 |
| 2013/0247465 A1* | 9/2013 | Koyama | C10J 3/723 48/99 |

\* cited by examiner

METHOD AND SYSTEM FOR COGENERATING GAS-STEAM BASED ON GASIFICATION AND METHANATION OF BIOMASS

CROSS-REFERENCE TO RELATED APPLICATIONS

This application is a divisional of and claims domestic priority benefits to U.S. application Ser. No. 14/522,630, filed Oct. 24. 2014, now pending. U.S. application Ser. No. 14/522,630, filed Oct. 24. 2014, now pending, is a continuation-in-part of International Patent Application No. PCT/CN2013/074232 with an international filing date of Apr. 16, 2013, designating the United States, now pending, and further claims priority benefits to Chinese Patent Application No. 201210128134.2 filed Apr. 27, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to the field of biomass energy, and more particularly to a method and system for cogenerating gas-steam based on gasification and methanation of biomass such as rice husk, straw, and sawdust.

Description of the Related Art

Crude syngas generated from biomass gasification contains a lot of CO, $H_2$, $CO_2$, etc., and is not suitable for direct use as a city gas and a fuel for combined cycle power plant because of its low calorific value and CO toxicity. Natural gas is suitable for use as a city gas and a fuel for combined cycle power plant because of its high calorific value and non-toxicity. In the presence of a catalyst, CO and $CO_2$ can be completely converted to methane, which is the synthetic substitute natural gas (SNG). Main reaction of the methanation is as follows:

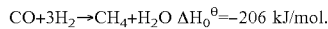

$$CO+3H_2 \rightarrow CH_4+H_2O \; \Delta H_0^\theta = -206 \text{ kJ/mol}.$$

Conventional method and system for producing gas-steam employ non-renewable coal as the raw material. The methanation reaction uses a molybdenum sulfide catalyst, the syngas conversion efficiency is low, and the processing capacity is limited. In addition, the isothermal reactor has complex design, complex structure, and high manufacturing costs, difficult mechanical amplification, so it is difficult for loading and unloading of catalysts. The methods impose harsh requirements for catalysts, the heat exchange efficiency between the product gas and steam circulation system is low, and the high quality steam and the reaction heat cannot be recycled, thereby leading to low recovery efficiency of methanation reaction heat.

SUMMARY OF THE INVENTION

On the basis of comprehensive utilization of gasification of biomass at high temperature and high pressure and methanation in a circulating adiabatic fixed bed, the invention provides a method and system for cogenerating gas-steam. Meanwhile, the method can generate a large amount of superheated steam and substitute natural gas with high efficiency.

In accordance with one embodiment of the invention, there provided is a method for cogenerating gas-steam based on gasification and methanation of biomass, the method comprising:

1) mixing oxygen and water vapor produced from an air separation plant with biomass, transporting a resulting mixture via a nozzle to a gasifier, gasifying the biomass at a temperature of 1,500-1,800° C. and a pressure of 1-3 MPa to yield crude gasified gas, and transporting superheated steam having a pressure of 5-6 MPa resulting from sensible heat recovery to a steam turbine;

2) according to demand for a methanation reaction, adjusting a hydrogen/carbon ratio of the crude gasified gas generated from step 1) to 3:1 using a shift reaction, and eluting the crude gasified gas using low-temperature methanol for desulfurization and decarburization, whereby yield purified syngas;

3) introducing the purified syngas in step 2) to a methanation unit comprising a primary methanation unit and a secondary methanation unit, the primary methanation unit comprising a first primary methanation reactor and a second primary methanation reactor connected in series; allowing part of process gas from the second primary methanation reactor to return to an inlet of the first primary methanation reactor to mix with fresh feed gas, and then to enter the first primary methanation reactor, so that a concentration of reactants at the inlet of the first primary methanation reactor is reduced and a catalyst bed temperature is controlled by the process gas; introducing the syngas after primary methanation to the secondary methanation unit comprising a first secondary methanation reactor and a second secondary methanation reactor connected in series, where a small amount of unreacted CO and a large amount of $CO_2$ is converted into $CH_4$; and transporting intermediate pressure superheated steam generated in the methanation unit to the steam turbine; and 4) concentrating methane of synthetic natural gas containing trace nitrogen and water vapor obtained from step 3) through pressure swing adsorption, so that a molar concentration of methane reaches 96%, and calorific value of the synthetic natural gas is up to 8,256 kcal/Nm$^3$.

In a class of this embodiment, the mixture in step 1) is introduced to an entrained flow gasifier through the nozzle at a rate of 100-120 m/s for parallel flow gasification.

In a class of this embodiment, the crude gasified gas from a side top of the gasifier in step 1) is controlled to have a temperature of 1,200-1,500° C.; waste heat of the crude gasified gas is recycled by a waste heat boiler to produce intermediate pressure superheated steam, a part of which is mixed with oxygen as a gasification agent, and the remaining is sent to the steam turbine; after heat recovery, the gasified gas temperature drops to 220-280° C.; the gasified gas is purified by a two-stage cyclone separator for removal of dust and is cooled by a washing tower, so as to reduce the gasified gas temperature to 50-55° C., reduce a dust content to below 50 mg/m$^3$, and the gasified gas comprises CO, $H_2$ and $N_2$.

In a class of this embodiment, the purified syngas in step 3) is divided into two equal streams comprising a first feed gas and a second feed gas, which respectively enters a first primary methanation reactor and a second primary methanation reactor; the first feed gas is first mixed with the process gas and then enters a catalytic bed of the first primary methanation reactor for a methanation reaction, a temperature thereof is controlled at 300-330° C.; an outlet temperature of the mixed gas is 600-630° C.; the intermediate pressure superheated steam is generated through a first waste heat boiler and a first steam superheater; the process gas from the first steam superheater is mixed with the second feed gas, and then enters the second primary methanation reactor for methanation reaction at 300 -330° C.; an outlet temperature of the process gas from the second primary methanation reactor is 600-630° C.; the process gas from the second primary methanation reactor passes through a second waste heat boiler and a second steam superheater to generate intermediate pressure superheated steam; the process gas from the second primary methanation reactor is divided into two streams: one stream accounts for 30-40%, and flows to the first primary methanation reactor via a recycle compressor; another stream accounts for 60-70%, and enters the first secondary methanation reactor; the process gas is cooled to 270-290° C. and enters the first secondary methanation reactor for further methanation reaction; an outlet temperature of mixed gas of the first secondary methanation reactor is 440-460° C., and an inlet temperature of a feed gas of the second secondary methanation reactor is 270-290° C.; and the intermediate pressure superheated steam generated from the methanation reaction is transported to the steam turbine.

In a class of this embodiment, the pressure of the intermediate pressure superheated steam that is generated by the first/second waste heat boiler and the first/second steam superheater in the primary methanation unit is 4.5-5 MPa.

In a class of this embodiment, the methanation reaction in step 3) employs high-load nickel as a catalyst, with a reaction temperature of 270-630° C., a pressure of 1-3 MPa, and a reaction formula of $CO+3H_2 \rightarrow CH_4+H_2O$, $\Delta H_0^\theta = -206$ kJ/mol.

In a class of this embodiment, after the process gas from the second primary methanation reactor is cooled through the second waste heat boiler and the second steam superheater, a first stream flowing to the first primary methanation reactor through the recycle compressor accounts for 60-70%; and a second stream entering the first secondary methanation reactor accounts for 30-40%.

The invention further provides a system for cogenerating gas-steam based on gasification and methanation of biomass comprising: a gasification unit, a shift unit, a purification unit, a methanation unit, and a methane concentration unit; a waste heat boiler is provided in an upper part of a gasifier of the gasification unit; waste heat of the crude gasified gas from the gasifier is recycled by the waste heat boiler to yield intermediate pressure superheated steam, which is transported to a steam turbine; an external thermostatic heater is provided in an outlet segment of the gasified gas of the gasifier to keep a gasification temperature within the gasifier at 1,500-1,800° C.; and a temperature of the crude gasified gas from the gasifier is controlled at 1,200-1,500° C.

In a class of this embodiment, the methanation unit comprises a primary methanation unit and a secondary methanation unit; the primary methanation unit comprises a first primary methanation reactor and a second primary methanation reactor connected in series; an outlet of the second primary methanation reactor is provided with two bypasses: one bypass is connected to an inlet of the first primary methanation reactor, so that the process gas therein is mixed with fresh feed gas, and then enters the first primary methanation reactor; the other bypass is connected to the secondary methanation unit, which comprises a first secondary methanation reactor and a second secondary methanation reactor connected in series; and the second secondary methanation reactor is connected to the methane concentration unit.

In a class of this embodiment, reaction heat of the mixed gas at the outlet of the first primary methanation reactor is recycled by the first waste heat boiler and the first steam superheater, and that of the mixed gas at the outlet of the second primary methanation reactor is recycled by the second waste heat boiler and the second steam superheater; and the intermediate pressure superheated steam generated therefrom is transported to the steam turbine.

The invention has the following advantages: (1) The gasifier uses an external thermostatic high-temperature heat source, which can significantly improve the active components of CO and $H_2$, and improve the biomass gasification efficiency; (2) Usually, the biomass gasification will produce a large amount of tar. High temperature of the gasification unit can greatly reduce the tar production, improve the carbon conversion, and save the investment in tar removal device. (3) The methanation reaction achieves the CO conversion rate of 100%, and the $H_2$ conversion rate of 99%; at the same time, produces a lot of by-product (intermediate pressure superheated steam), and reduces power consumption of the recycle compressor in the traditional methanation reaction; (4) The biggest advantage of the invention is that it can not only convert biomass energy into clean natural gas with high calorific value and convenient for use, but also efficiently recycle a lot of heat released from gasification and methanation of biomass by way of producing high grade superheated steam.

DETAILED DESCRIPTION OF THE EMBODIMENTS

The invention is further illustrated in more detail in the light of the drawings and embodiments, which are not intended to define the protection scope of the invention.

Figure 1:
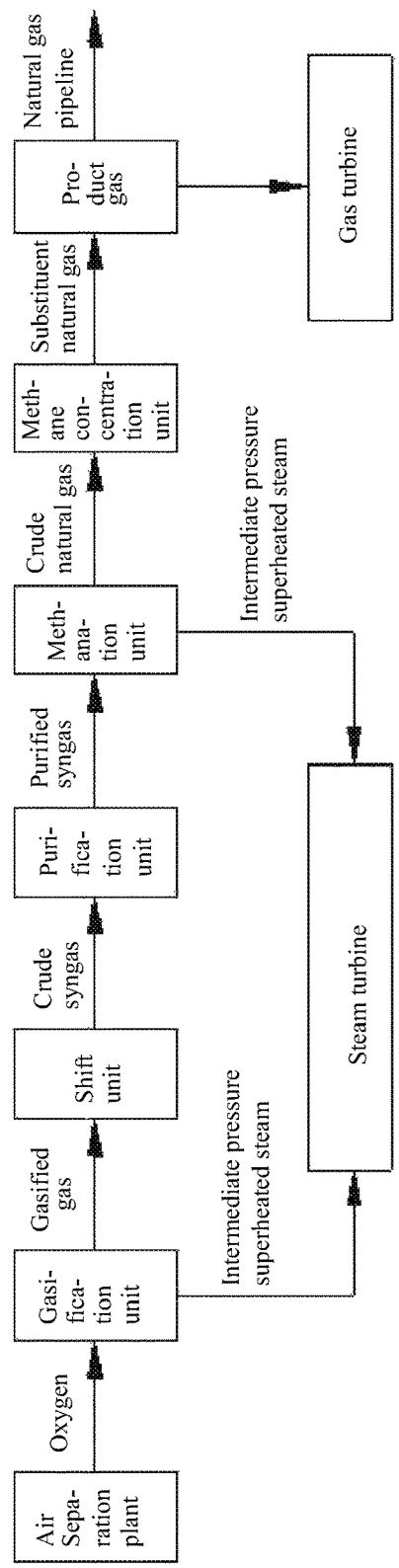
FIG. 1 is a flow diagram of a method for cogenerating gas-steam based on gasification and methanation of biomass of the invention.
Figure 2:
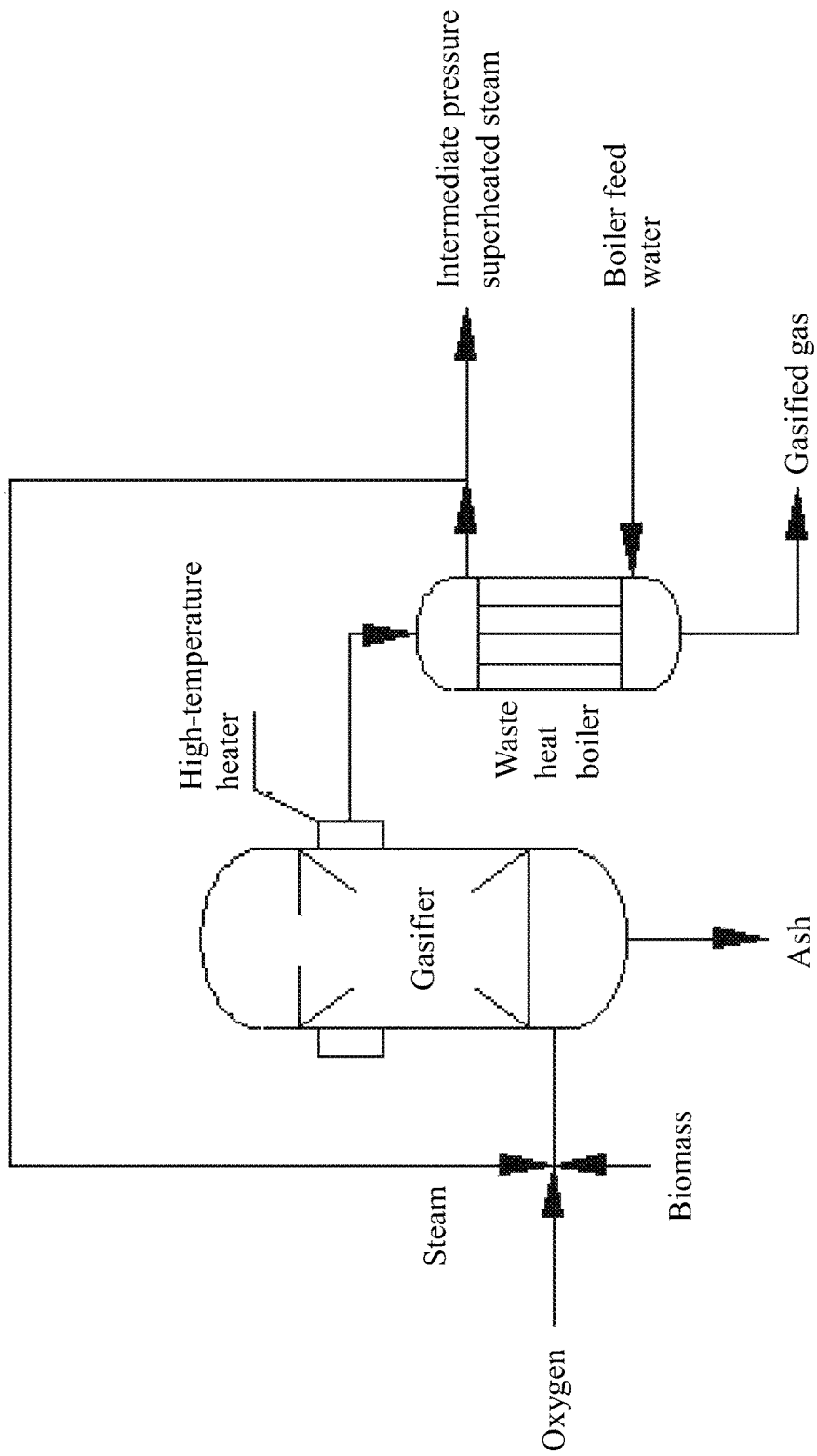
FIG. 2 is a schematic diagram of a gasification unit of the invention.
Figure 3:
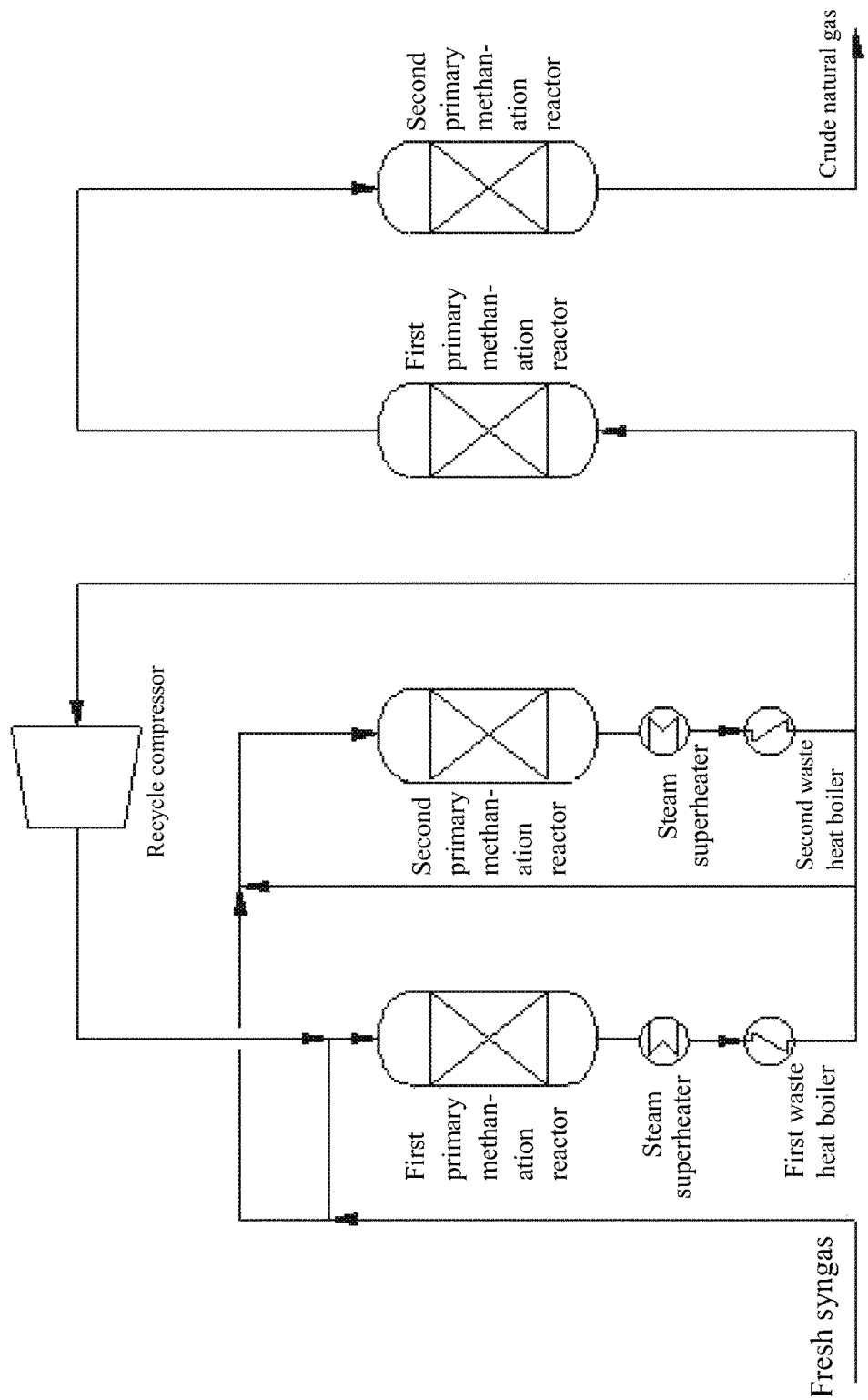
FIG. 3 is a schematic diagram of a methanation unit of the invention.

As shown in FIG. 1, FIG. 2 and FIG. 3:

Step 1): Rice straw, crop stalk and other biomass were dried, crushed and sorted. Biomass raw material with the diameter or maximum length below 2 mm was directly transported to the gasifier of the high-temperature airflow bed through a screw feeder. The pressure in the gasifier was 1-3 MPa. An external thermostatic heater was provided in the outlet segment of the gasified gas of the biomass gasifier to keep the gasification temperature within the gasifier at 1,500-1,800° C., and guarantee the gasification intensity, gasified gas quality and strengthened heat transfer process. As the gasification agent, superheated water vapor and oxygen were premixed, and then fully mixed with the treated biomass. The mixture was injected into the gasifier with a special nozzle at a rate of 100-120 m/s for gasification by way of parallel flow. Due to small particle size and strong heat transfer ability of the airflow bed, raw material was heated to the furnace temperature as soon as it entered the furnace. Almost at the same time, there was moisture evaporation, volatile matter decomposition, tar cracking, carbon combustion and gasification. Alkali-containing metal ash was converted to liquid slag, and then directly discharged. Small biomass particles were retained in the reaction zone for less than 3s, rapidly gasified before melting, and respectively separated by the high-speed gas flow without the phenomenon of bonding and cohesion etc. Crude gasified gas from the side top of the gasifier was controlled at a temperature of 1,200-1,500° C. The upper part of the gasifier was provided with a waste heat boiler. The crude gasified gas from the gasifier entered the waste heat boiler to recover waste heat, and produced a lot of steam. After heat recovery, the gasified gas temperature dropped to 220-280° C. Then most dust and water vapor in the gasified gas were purified and cooled through two stage cyclone separators and a washing tower, so as to reduce the gasified gas temperature to about 50-55° C., reduce dust content to below 50 mg/m$^3$, and generate the gasified gas mainly containing $CO$, $H_2$ and $N_2$.

Step 2): After washing and dust removal, crude gasified gas entered the sulfur-tolerant shift process, the ratio of $H_2$, $CO$ and $CO_2$ therein was adjusted to the hydrogen/carbon ratio of 3:1, and the vast majority of organic sulfur therein was converted into inorganic sulfur. Then the gas was purified, and washed with methanol at low temperature, so that methanol was used to remove unwanted $CO_2$ and all sulfides from methanation reaction of the process gas, and the process gas composition achieved the methane production requirements. Methanol rich in $CO_2$, $H_2S$ and $COS$ was recycled by flash evaporation under reduced pressure and nitrogen stripping etc. and the cooling capacity therein was recovered for re-use.

Step 3) methanation: The purified syngas in step 2) at adjusted hydrogen/carbon ratio can be divided into two approximately equal streams, which respectively entered the first primary methanation reactor and the second primary methanation reactor. Feed gas entering the first methanation reactor was first mixed with the recycle gas. The mixed gas at 300-330° C. entered the catalytic bed of the adiabatic reactor, wherein the exothermic methanation reaction occurred. Outlet temperature of the hot gas was about 600-630° C., and the hot gas was used to produce intermediate pressure superheated steam in the first waste heat boiler and superheat intermediate pressure superheated steam in the first superheater. The process gas from the first superheater was mixed with another stream of fresh feed gas. The mixed gas at 300-330° C. entered the second methanation reactor for further methanation reaction.

Outlet temperature of the gas of the second primary methanation reactor was about 600-630° C., which was used to produce steam in the second waste heat boiler and preheat recycle gas in the second superheater. Hot process gas from the second waste heat boiler was divided into two streams: one stream accounted for 30-40%, and flowed to the first primary methanation reactor via a recycle compressor; another stream accounted for 60-70%, and entered the first secondary methanation reactor.

Inlet temperature of the feed gas of the second secondary methanation reactor was 270-290° C., and further methanation reaction occurred in the second secondary methanation reactor, in order to achieve the specification of SNG product. Intermediate pressure superheated steam generated from the methanation reaction was transported to the steam turbine.

Pressure of the intermediate pressure superheated steam that was generated by the waste heat boiler and steam superheater using the recycling reaction heat in the primary methanation reaction stage was 4.5-5 MPa.

The methanation was carried out with high-load nickel as the catalyst, at the reaction temperature of 270-630° C., under the pressure of 1-3 MPa, and following

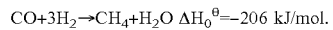

Step 4) Methane concentration: After methane was concentrated through pressure swing adsorption of crude natural gas, substituent natural gas following national standard was obtained. In general, the natural gas enters the urban gas pipeline as domestic gas, and may also enter the gas turbine to generate electricity in case of power shortage.

As shown in FIG. 1, a method and system for cogenerating gas-steam based on gasification and methanation of biomass comprises a gasification unit, a shift unit, a purification unit, a methanation unit and a methane concentration unit.

As shown in FIG. 2, a waste heat boiler is provided in the upper part of the gasifier of the gasification unit. Intermediate pressure superheated steam is generated by the waste heat boiler using the recycling waste heat of the crude gasified gas from the gasifier, and is transported to the steam turbine. An external thermostatic heater is provided in the outlet segment of the gasified gas of the biomass gasifier to keep the gasification temperature within the gasifier at 1,500-1,800° C. Crude gasified gas from the gasifier is controlled at a temperature of 1,200-1,500° C.

As shown in FIG. 3, the methanation unit comprises a primary methanation unit and a secondary methanation unit. The primary methanation unit is composed of two reactors connected in series with two reactors connected in parallel in either stage. The outlet of the second primary methanation reactor is provided with two bypasses: one bypass is connected to the inlet of the first primary methanation reactor, so that the process gas therein is mixed with fresh feed gas, and then enters the first primary methanation reactor; the other bypass is connected to the secondary methanation reactor, which comprises a first secondary methanation reactor and a second secondary methanation reactor connected in series. The second secondary methanation reactor is connected to the methane concentration unit. After the second stage primary methanation, a part of the process gas returns to the inlet of the first primary methanation reactor, is mixed with fresh feed gas, and then enters the first primary methanation reactor, in order to reduce the reactant concentration at the inlet of the primary methanation reactor. On the other hand, the recycle process gas is used for inert medium heating to control the catalyst bed temperature. The vast majority of methanation reaction is completed at the primary methanation stage. Reaction temperature of the secondary methanation is lower than that of the primary methanation. This stage is composed of two secondary methanation reactors connected in series, and converts a small amount of unreacted CO and most of the $CO_2$ into $CH_4$. Product gas from the methanation stage is transported to the methane concentration process.

Reaction heat of the mixed gas at the outlet of the first primary methanation reactor is recycled by the first waste heat boiler and the steam superheater, and that of the mixed gas at the outlet of the second primary methanation reactor is recycled by the second waste heat boiler and the steam superheater. The intermediate pressure superheated steam generated therefrom is transported to the steam turbine.

EXAMPLE 1

Calculation of the overall system performance under the basic load with 1,000 tons/day raw material biomass.

Dry rice straw is used as the gasification biomass in Example 1. Its ingredients and calorific value are shown in Table 1.

TABLE 1

Ingredients and calorific value of biomass

| Items | Content | Unit | Rice straw |
|---|---|---|---|
| calorific value | Qar, net | MJ/kg | 11.346 |
| Elements | Carbon Car | % | 37.162 |
|  | Hydrogen Har | % | 2.748 |
|  | Oxygen Oar | % | 35.136 |
|  | Nitrogen Nar | % | 0.905 |
|  | Sulfur Sar | % | 0.029 |

In example 1, biomass 1000 tons/day, and the gasification agent comprising 93 vol. % of oxygen is employed for gasification.

TABLE 2

Material balance and performance parameters of gas product

| | Example 1 | | | |
|---|---|---|---|---|
| | Gasified gas | Shift gas | Syngas | Gas product |
| Rate of flow $Nm^3/h$ | 43960 | 53320 | 29300 | 7350 |
| Percentage vol. % | | | | |
| CO | 43.41% | 12.03% | 20.36% | 0.01% |
| $H_2$ | 16.42% | 37.30% | 67.53% | 0.30% |
| $N_2$ | 5.77% | 4.76% | 8.04% | 1.17% |
| $CO_2$ | 21.19% | 41.23% | 1.88% | 1.13% |
| $CH_4$ | 1.92% | 1.59% | 2.16% | 96.13% |
| $H_2O$ | 9.29% | 1.45% | 0.03% | 1.26% |
| $C_2$—$C_4$ | 1.92% | 1.59% | 0.00% | 0.00% |
| Caloric value of syngas kcal/$m^3$ | | | 2579 | 8227 |
| Yield of syngas $m^3/d$ | | | | 176400 |
| Chemical synthesis efficiency from biomass to syngas (chemical energy of SNG/biomass chemical energy of biomass) | | | | 47% |
| Steam from methanation | 450° C., 4.7 MPa (t/h) | | | 21.45 |

EXAMPLE 2

Biomass 1000 tons/day, and the gasification agent comprising 98 vol. % of oxygen is employed for gasification.

TABLE 3

Material balance and performance parameters of gas product

| | Example 2 | | | |
|---|---|---|---|---|
| | Gasified gas | Shift gas | Syngas | Gas product |
| Rate of flow $Nm^3/h$ | 51140 | 64640 | 39670 | 10190 |
| Percentage vol. % | | | | |
| CO | 52.10% | 14.46% | 21.91% | 0.01% |
| $H_2$ | 22.81% | 44.81% | 72.66% | 0.20% |
| $N_2$ | 2.02% | 1.60% | 2.48% | 2.00% |
| $CO_2$ | 12.55% | 36.70% | 1.79% | 0.28% |
| $CH_4$ | 1.17% | 0.92% | 1.13% | 96.47% |
| $H_2O$ | 9.27% | 1.45% | 0.02% | 1.03% |
| $C_2$—$C_4$ | 0.02% | 0.01% | 0.00% | 0.00% |
| Caloric value of syngas kcal/$m^3$ | | | 2672 | 8256 |
| Yield of syngas $m^3/d$ | | | | 244560 |
| Chemical synthesis efficiency from biomass to syngas (chemical energy of SNG/biomass chemical energy of biomass) | | | | 64% |
| Steam from methanation | 450° C., 4.7 MPa (t/h) | | | 30.90 |

The invention claimed is:

1. A system for cogenerating gas-steam based on gasification and methanation of biomass, the system comprising:
   a gasification unit comprising a gasifier, the gasifier comprising an upper part that is disposed higher with respect to the ground than the remaining parts of the gasifier, a waste heat boiler, an external thermostatic heater, and an outlet segment;
   a shift unit;
   a purification unit;
   a methanation unit; and
   a methane concentration unit;
   wherein:
   the gasifier is adapted to yield a crude gasified gas;
   the waste heat boiler is connected to the upper part;
   the waste heat boiler is adapted to recycle waste heat of the crude gasified gas to yield a first intermediate pressure superheated steam;
   the external thermostatic heater is disposed at the outlet segment to keep a gasification temperature within the gasifier at 1,500-1,800° C.; and
   the purification unit is adapted to purify the crude gasified gas to yield a purified syngas.

2. The system of claim 1, wherein
   the methanation unit comprises a primary methanation unit and a secondary methanation unit;
   the primary methanation unit comprises a first primary methanation reactor comprising a first outlet and an inlet and a second primary methanation reactor comprising a second outlet, and the first primary methanation reactor and the second primary methanation reactor are connected in series;
   the secondary methanation unit comprises a first secondary methanation reactor and a second secondary methanation reactor connected in series;
   the second outlet is provided with two bypasses: one of the two bypasses is connected to the inlet of the first primary methanation reactor to yield a first mixed gas; the other of the two bypasses is connected to the secondary methanation unit to yield a second mixed gas; and
   the second secondary methanation reactor is connected to the methane concentration unit.

3. The system of claim 2, further comprising a first waste heat boiler, a first steam superheater, a second waste heat boiler, and a second steam superheater, wherein
   the first waste heat boiler and the first steam superheater are adapted to recycle reaction heat of the first mixed gas at the first outlet to generate a second intermediate pressure superheated steam; and
   the second waste heat boiler and the second steam superheater are adapted to recycle reaction heat of the second mixed gas at the second outlet to generate a third intermediate pressure superheated steam.

* * * * *